(12) United States Patent
Joffe

(10) Patent No.: US 7,773,744 B1
(45) Date of Patent: Aug. 10, 2010

(54) SYSTEM AND METHOD FOR TERMINATING SEALING CURRENT

(75) Inventor: Daniel M. Joffe, Owens Crossroads, AL (US)

(73) Assignee: ADTRAN, Inc., Huntsville, AL (US)

( * ) Notice: Subject to any disclaimer, the term of this patent is extended or adjusted under 35 U.S.C. 154(b) by 1441 days.

(21) Appl. No.: 10/981,285

(22) Filed: Nov. 4, 2004

(51) Int. Cl.
  *H04M 1/00* (2006.01)
(52) U.S. Cl. .................. 379/412; 379/29.04; 379/413
(58) Field of Classification Search ............. 379/29.03,
  379/29.04, 93.36, 102.04, 106.04, 307, 318,
  379/322, 324, 378, 395.01, 413, 399.01,
  379/414, 29.05, 377, 404
  See application file for complete search history.

(56) References Cited

U.S. PATENT DOCUMENTS 4,716,358 A * 12/1987 Fucito ..................... 323/316
4,771,449 A * 9/1988 Kiko et al. ................ 379/93.05
4,984,250 A * 1/1991 Koyama .................... 375/257
5,131,033 A * 7/1992 Reum ....................... 379/413
5,442,697 A * 8/1995 McGary et al. .......... 379/399.02
6,560,129 B1 * 5/2003 Walger ...................... 363/50
7,027,587 B2 * 4/2006 Menasco, Jr. .............. 379/377

OTHER PUBLICATIONS

"Integrated Services Disginal Network (ISDN) Basic Access Interface for Use of Metallic Loops for Application on the Network Side of the NT (Layer 1 Specification)", ANSI T1.601-1992, (Dec. 2003).
"Single Pair High Speed Digital Subscriber Line (SHDSL) Transceivers", ITU-T Recommendation G.991.2,(Dec. 2003).

* cited by examiner

*Primary Examiner*—Fan Tsang
*Assistant Examiner*—Akelaw A Teshale
(74) *Attorney, Agent, or Firm*—Lanier Ford Shaver & Payne, P.C.; Jon E. Holland

(57) ABSTRACT

A sealing current system for a subscriber line that comprises a power source coupled to a first end of the subscriber line configured to apply a voltage to the subscriber line. The sealing current termination circuit coupled to a second end of the subscriber line configured to limit a current in the subscriber line, the current produced by the applied voltage.

28 Claims, 15 Drawing Sheets

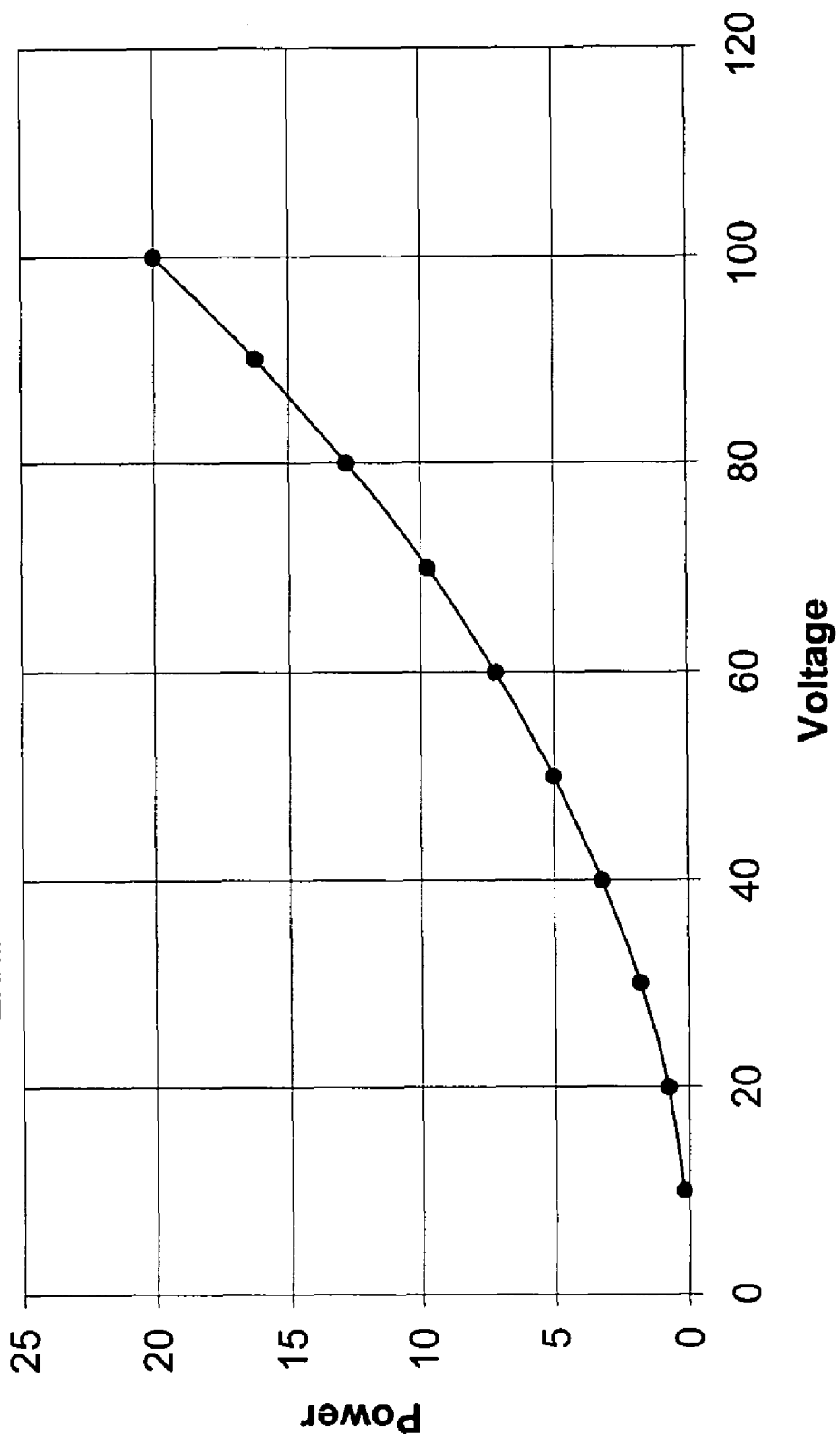

Representation of Power Dissipation Exhibited with Current Limited

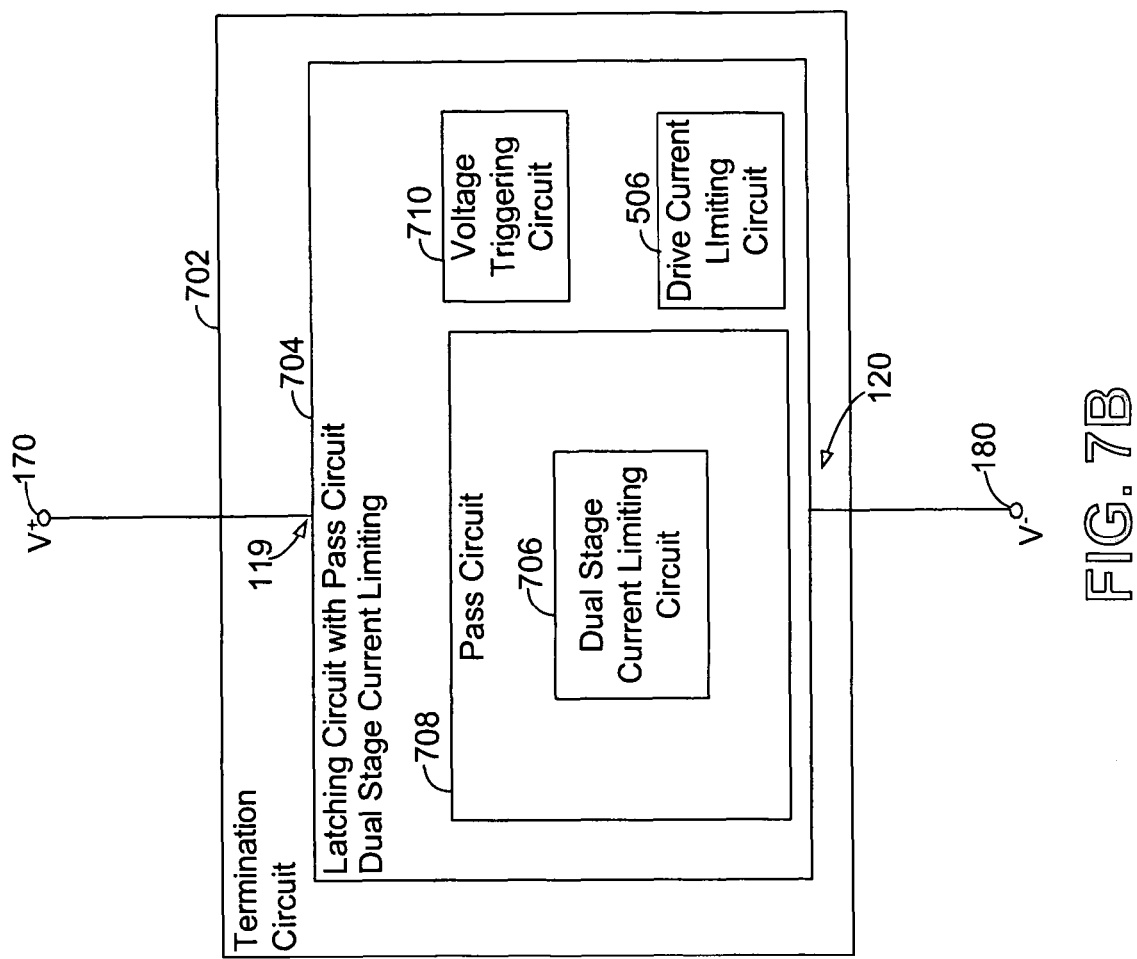

SYSTEM AND METHOD FOR TERMINATING SEALING CURRENT

RELATED ART

Data communication systems often introduce a current into connections via a direct current (DC) power source in order to prevent the degradation of splices. Such a current is referred to as a "sealing current" and is typically a low current (e.g., 1-20 mA) DC signal introduced by the DC power source at a central office of a communication network. The subscriber line through which the sealing current flows is connected at one end to a DC source and on the other end to a termination circuit. The two ends of the data communications circuit are typically terminated by a sealing current generation and termination circuit.

The American National Standard Institute has promulgated standards entitled "Integrated Services Digital Network (ISDN)-Basic Access Interface for Use on Metallic Loops for Application on the Network Side of the NT (Layer 1 Specification)," ANSI T1.601-1999, ("ANSI standard") that sets forth standard characteristics of a termination circuit for a subscriber line in an ISDN. In addition, the International Telecommunication Union (ITU) has promulgated the standards entitled "Series G: Transmission Systems and Media, Digital Systems and Networks-Single-Pair High-Speed Digital Subscriber Line (SHDSL) transceivers," ITU-T G.991.2 2/2001 ("ITU Standard") that sets forth the standard characteristics of a termination circuit for subscriber lines in an SHDSL network.

Specifically, the ANSI standard and the ITU Standard (collectively referred to hereinafter as the "Standards") propose an activation voltage for a termination circuit of 30.0 to 39.0 volts. While the termination circuit is in the "on" state, the Standards provide that the current shall be greater than or equal to 20 milliamps (mA) when the voltage across the connections is 15 Volts, and the termination circuit shall remain in the "on" state once it begins conducting so long as the current is greater than a hold/release current $I_{hr}$, which can be in, the range of 0.1 mA to 1.0 mA. Finally, the standards provide that if the voltage across a subscriber line is greater than 54 Volts, then the current through the termination circuit shall be greater than or equal to 9 mA.

SUMMARY OF THE DISCLOSURE

Generally, the present disclosure provides a system and method for minimizing power dissipation through the sealing current termination circuit of a communication system.

A system in accordance with an embodiment of the present invention comprises a power source coupled to a first end of the subscriber line configured to apply a voltage to the subscriber line. The system further comprising a sealing current termination circuit coupled to a second end of the subscriber line, the termination circuit configured to limit a current in the subscriber line, the current produced by the applied voltage.

A method in accordance with an embodiment of the present disclosure comprises the steps of applying a voltage to a first end of the subscriber line and limiting a current resulting from the applied voltage through a circuit at a second end of the subscriber line to a substantially constant current value.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 2 is a graph illustrating power dissipation of the termination circuit depicted in FIG. 1B.

FIG. 7B is a block diagram of the latching circuit of FIG. 7B with the dual stage current limiting circuit.

DETAILED DESCRIPTION

Embodiments of the present disclosure generally pertain to communication systems that introduce sealing current into a subscriber line that connects central office equipment to customer premises equipment (CPE). In addition to providing a communication signal, the communication system comprises a low power dissipation sealing current termination circuit for terminating a subscriber line and conforming to the voltage and/or current parameters, e.g., voltage and/or current parameters set forth in the Standards.

In this regard, the termination circuit disclosed herein conducts current when the voltage across the circuit equal or exceeds a threshold value referred to as an activation voltage. In one embodiment, the termination circuit limits the current to a substantially constant current value by limiting the current of a drive circuit. In another embodiment, the termination circuit limits the current to a substantially constant current value by limiting the current of a pass circuit to a single constant current value. In yet another embodiment, the termination circuit limits the current to a substantially constant current value by limiting the current of the pass circuit to dual constant current values depending upon a voltage applied to the termination circuit.

Figure 1A:
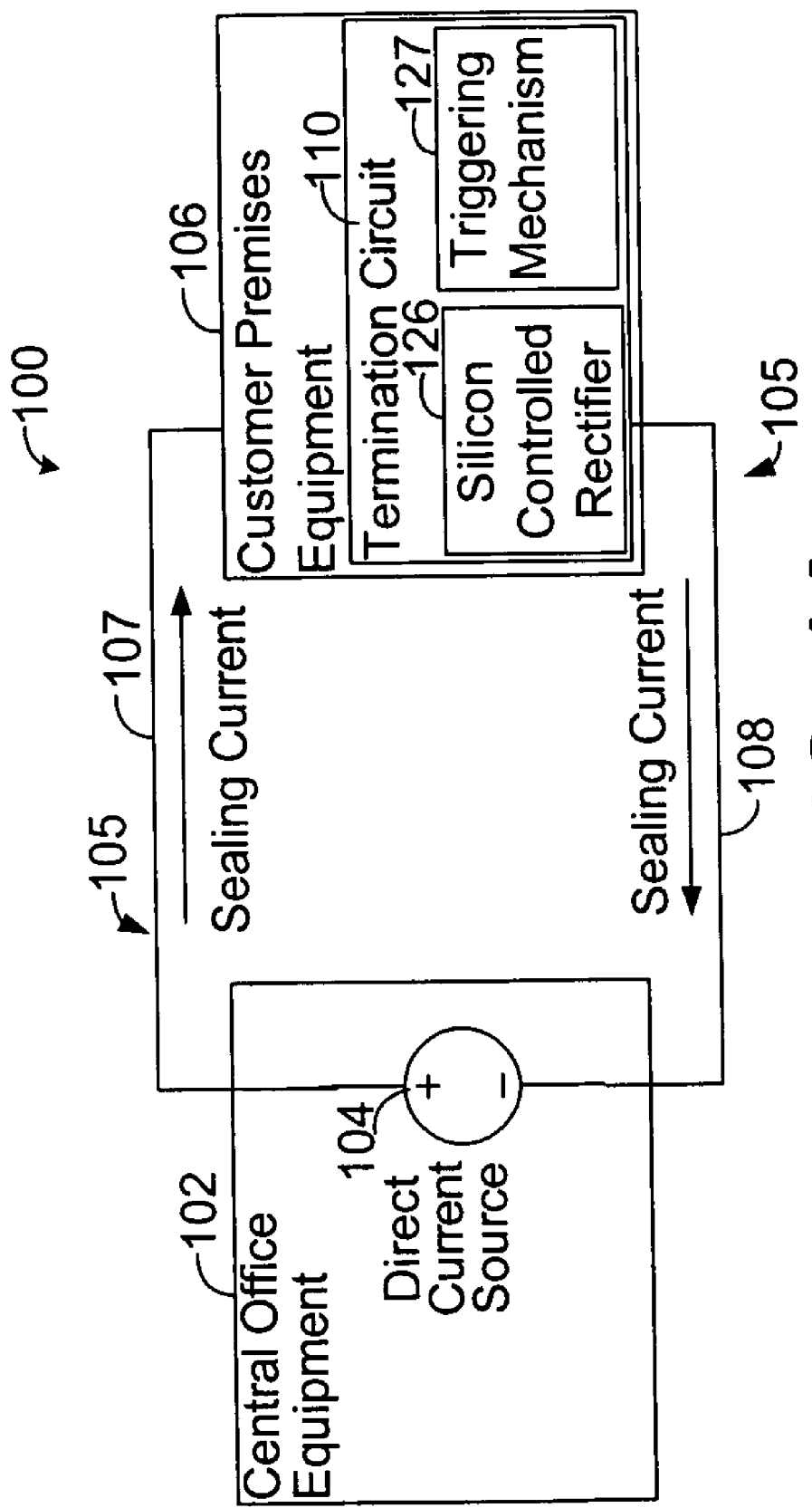
FIG. 1A is a block diagram illustrating a sealing current circuit of a conventional communication system.

FIG. 1A depicts a block diagram of the sealing current circuit 100 of a conventional communication system. The circuit 100 of FIG. 1A comprises a subscriber line 105 having a pair of conductive wires 107 and 108. The wires 107 and 108 communicatively couple central office equipment 102 to customer premises equipment (CPE) 106. A DC voltage source 104 coupled to the wires 107 and 108 of the central office equipment 102 applies a voltage across the wires 107 and 108, and a termination circuit 110 of the CPE 106 terminates each of the wires 107 and 108 to complete a circuit path for each wire 107 and 108.

The termination circuit 110 comprises a silicon controlled rectifier (SCR) 126 and a triggering mechanism 127. The SCR 126 is not conductive until a voltage equal to or greater than a particular voltage, referred to as an "activation voltage," is applied to the SCR 126 by the triggering mechanism 127. Note that "activation" of an SCR refers to a state when a voltage equal to or greater than the activation voltage is applied to the SCR.

Upon activation, the SCR 126 enables current flow in the termination circuit until the current flow through SCR 126 drops below a holding current. The "holding current" refers to a minimum current value that keeps the SCR 126 in a conducting state. Thus, activating the SCR 126 allows sealing current provided by the DC source 104 to flow through the wires 107 and 108, thereby reducing deterioration of splices which may be present in the wires 107 and 108.

Figure 1B:
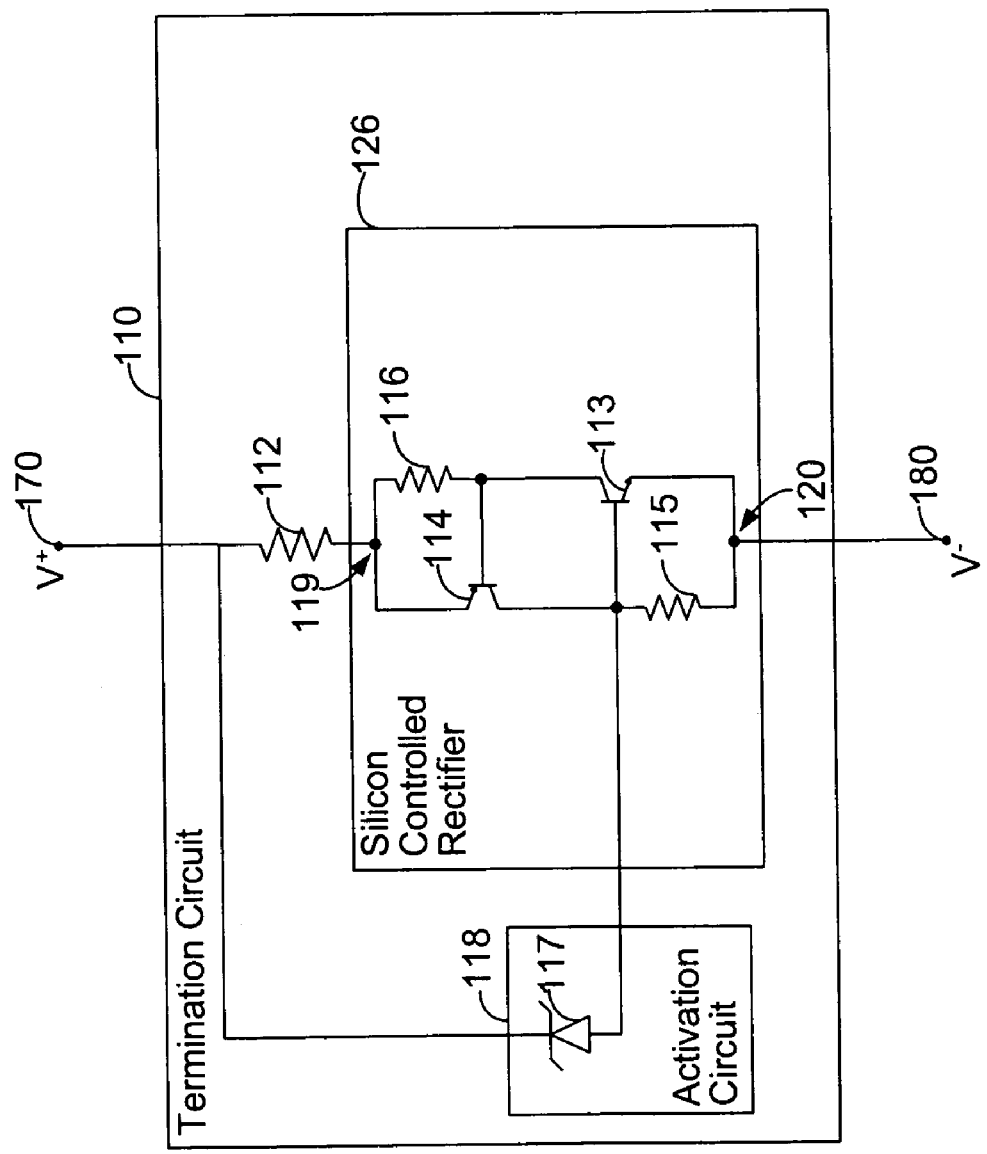
FIG. 1B is a block diagram illustrating a termination circuit of the sealing current circuit of FIG. 1A.

FIG. 1B depicts an exemplary conventional termination circuit 110 that may be employed in the sealing current circuit 100 of FIG. 1A. The termination circuit 110 comprises a resistor 112 having a fixed resistance, an exemplary SCR 126, and an activation circuit 118. The SCR 126 of FIG. 1B has an anode 119 and a cathode 120, wherein the anode 119 is typically connected to a positive voltage with respect to the cathode 120. The SCR 126 comprises a set of transistors 113 and 114 and a set of corresponding resistors 115 and 116.

The activation circuit 118 is a mechanism for activating, turning on, the SCR 126. An exemplary activation circuit 118 comprises a zener diode 117 conductively coupled to nodes 170 and 180. The zener diode 117 is configured to conduct current when the voltage across nodes 170 and 180 is greater than the activation voltage of the zener diode 117. Note that the activation circuit 118 may be implemented by diodes, switches, or other types of devices capable of controlling the flow of electrical current.

When current flows in zener diode 117 a bias voltage across resistor 115 causes transistor 113 to turn on. Current flowing through transistor 113 provides a bias voltage for turning on transistor 114, placing the SCR 126 in a conducting state.

When the SCR 126 is conducting, transistors 113 and 114 share more or less equally in carrying the current that flows from node 170 to node 180. Further, there is positive feedback from transistor 113 to transistor 114 that keeps the SCR 126 in a conducting state until the current through the transistors 113 and 114 drops sufficiently to decrease the positive feedback to the point where the transistors 113 and 114 no longer conduct current.

During operation, the termination circuit 110 dissipates power (P) approximately in accordance with the following formula:

$$P = V^2/R_f,$$

where V is the voltage applied between the nodes 170 and 180 and $R_f$ is the value of the fixed resistance of resistor 112. Note that this equation does not take into account any voltage drop across the SCR 126, however, it is representative of the power dissipation of the termination circuit 110.

Notably, one with skill in the art will recognize that the voltage between the base and emitter of most silicon transistors is approximately 0.6 volts if the transistor is "on." Thus, the SCR 126 begins to conduct current when the voltage across the nodes 170 and 180 is approximately the sum of the break-down voltage of the zener diode 117 and the base-emitter voltage of the transistor 113. The turn-on gate current (I) may then fall in the range shown by the inequality:

$$V_{BE113}/R_{115} < I < V_{BE113}/R_{115} + V_{BE114}/R_{116}$$

where $V_{BE113}$ is the base-emitter voltage of transistor 113, $R_{115}$ is the resistance of resistor 115, $V_{BE114}$ is the base-emitter voltage of transistor 114, and $R_{116}$ is the resistance of resistor 116. Thus, as an example, assume that resistor 115 is 1000 ohms. When resister 115 is 1000 ohms and there is 0.6 volts applied at the base-emitter junction of transistor 114, the turn-on current of the SCR 126 is approximately 0.6 mA and the holding current ($I_h$) for the SCR 126 can be calculated according to the following:

$$I_h = V_{BE113}/R_{115} + V_{BE114}/R_{116} = 0.6/1000 + 0.6/1000 = 1.2 \text{ mA},$$

where $V_{BE113}$ represents the base-emitter voltage of transistor 113, $R_{115}$ represents the resistance of resistor 115, $V_{BE114}$ represents the base-emitter voltage of transistor 114, and $R_{116}$ represents the resistance of resistor 116. Note that the holding current is the minimum amount of current that can be present in the SCR 126 in order for the SCR 126 to remain in the conducting state. Thus, once the SCR 126 is active and conducting, as the voltage across the nodes 170 and 180 continues to increase, the current through the SCR 126 continues to increase. The SCR 126 only deactivates when the current through the SCR 126 falls below a holding current, $I_h$, e.g., 1.2 mA.

FIG. 2 is a graph that illustrates generally the power dissipation of the termination circuit 110 as the voltage across the termination circuit 110. The graph is calculated based upon a fixed resistance of 500 ohms. As illustrated, the termination circuit 110 dissipates power as the square of the input voltage, which illustrates the circuit's inefficiency as the voltage across the nodes 170 and 180 increases. Notably, at 100 volts, the termination circuit dissipates 20 watts of power.

Figure 3:
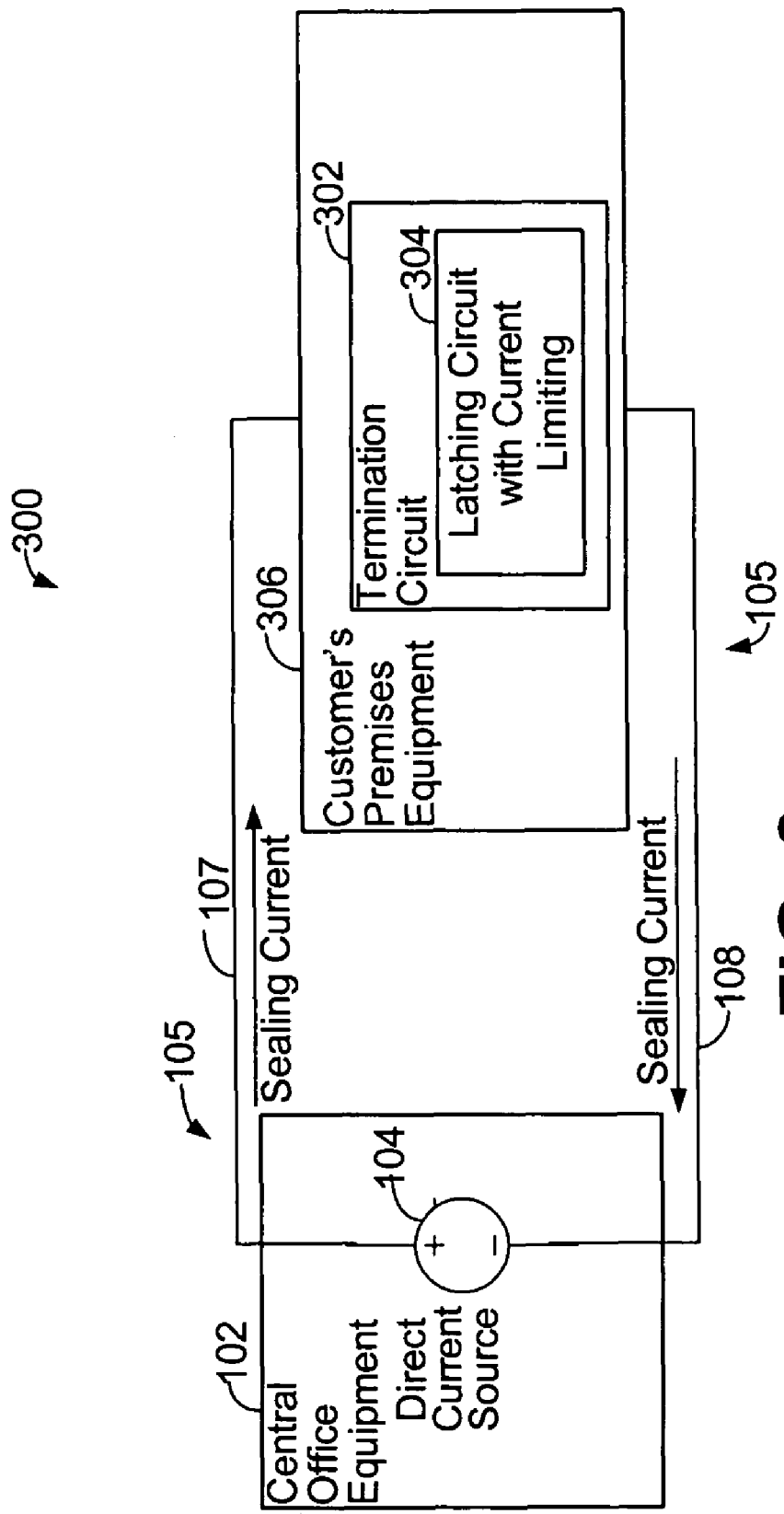
FIG. 3 is a block diagram illustrating a sealing current circuit of an exemplary data communication system of the present disclosure.

FIG. 3 depicts a sealing current circuit 300 of the present disclosure. The circuit 300 comprises central office equipment 102 and termination circuit 302 of CPE 306. The central office equipment 102 comprises a DC power source 104 that is connected to the termination circuit 302 over subscriber line 105 that dissipates less power than the termination circuit of FIG. 1B. The termination circuit 302 comprises a latching circuit with current limiting 304.

When activated, the latching circuit with current limiting 304 conducts a substantially constant current. By limiting the current through the circuit 300, the latching circuit with current limiting 304 limits the power dissipation of the termination circuit 302 such that power dissipation is substantially linear as opposed to square-law as seen in FIG. 2. In general, linear power dissipation is more cost effective, as compared to a square-law power dissipation, because less power is needed from the central office equipment 102. Thus, if linear power dissipation is available in the CPE 306 there is less demand on the power supply 204 of the central office equipment 102. In general, the size and cost of the central office power supply 104 is reduced. Further, by keeping the power dissipation linear, the thermal burden on the CPE 306 is decreased, and the circuit 300 is generally more tolerant of fault conditions.

The power dissipation behavior of the circuit 302 is described by the following equation:

$$P = VI,$$

where V is the voltage across termination circuit 302 and I is the value of the limiting current through the termination circuit 302.

Figure 4:
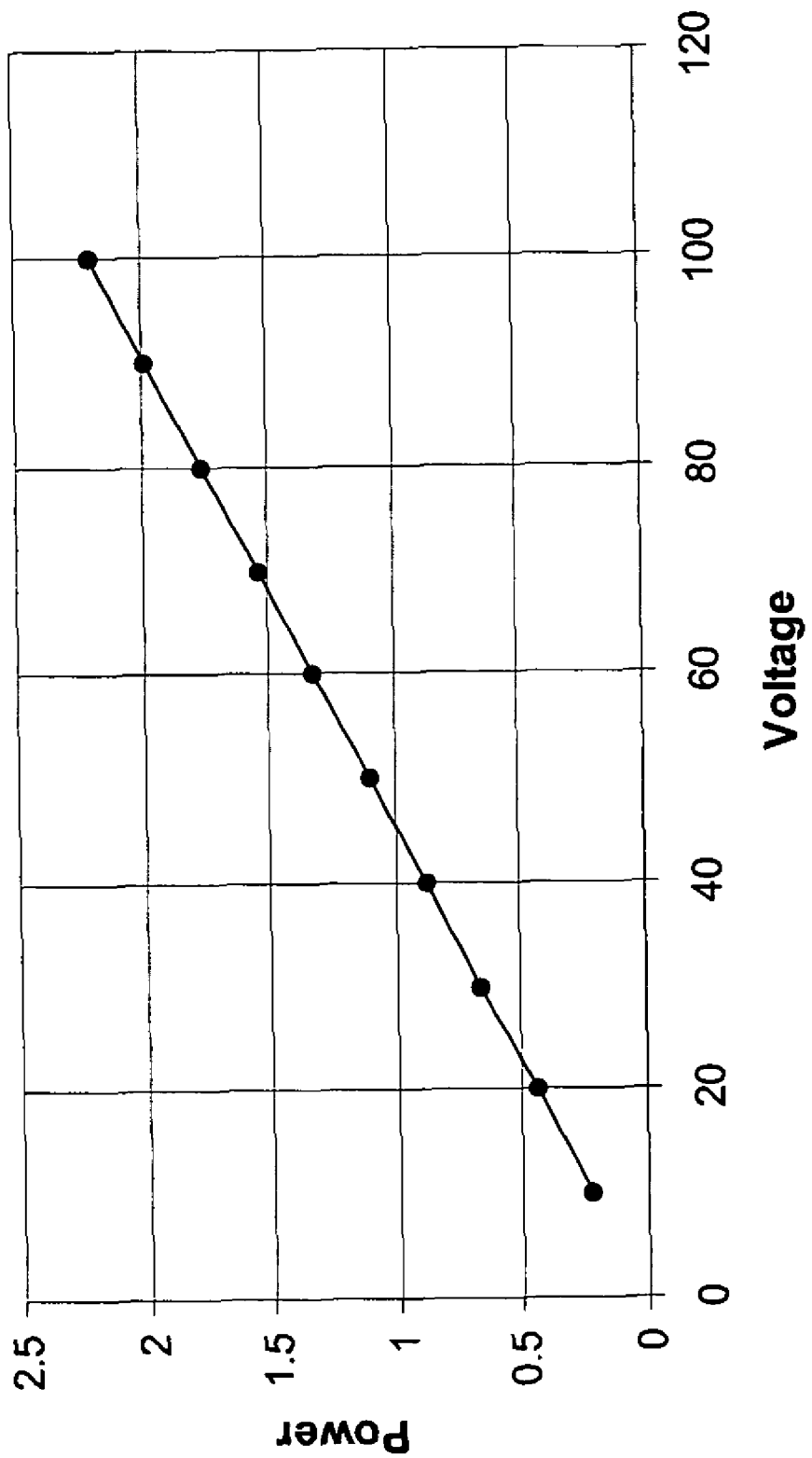
FIG. 4 is a graph illustrating power dissipation of the sealing current circuit depicted in FIG. 3.

FIG. 4 is a graph that illustrates power dissipation of the termination circuit 302 as the voltage applied by the power source 104 increases. The graph is calculated assuming that a fixed current of 22 mA is passing through the termination circuit 302, although other essentially constant current values are possible in other embodiments. As shown, the termination circuit 302 dissipates power linearly as the voltage applied by the power source 104 increases. As described with reference to the graph in FIG. 2, the power dissipated by the conventional termination circuit at 100 volts is 20 Watts. Pivotally, however, at 100 volts and 22 mA, the power dissipated by the termination circuit 302 is merely 2.2 Watts.

Figure 5A:
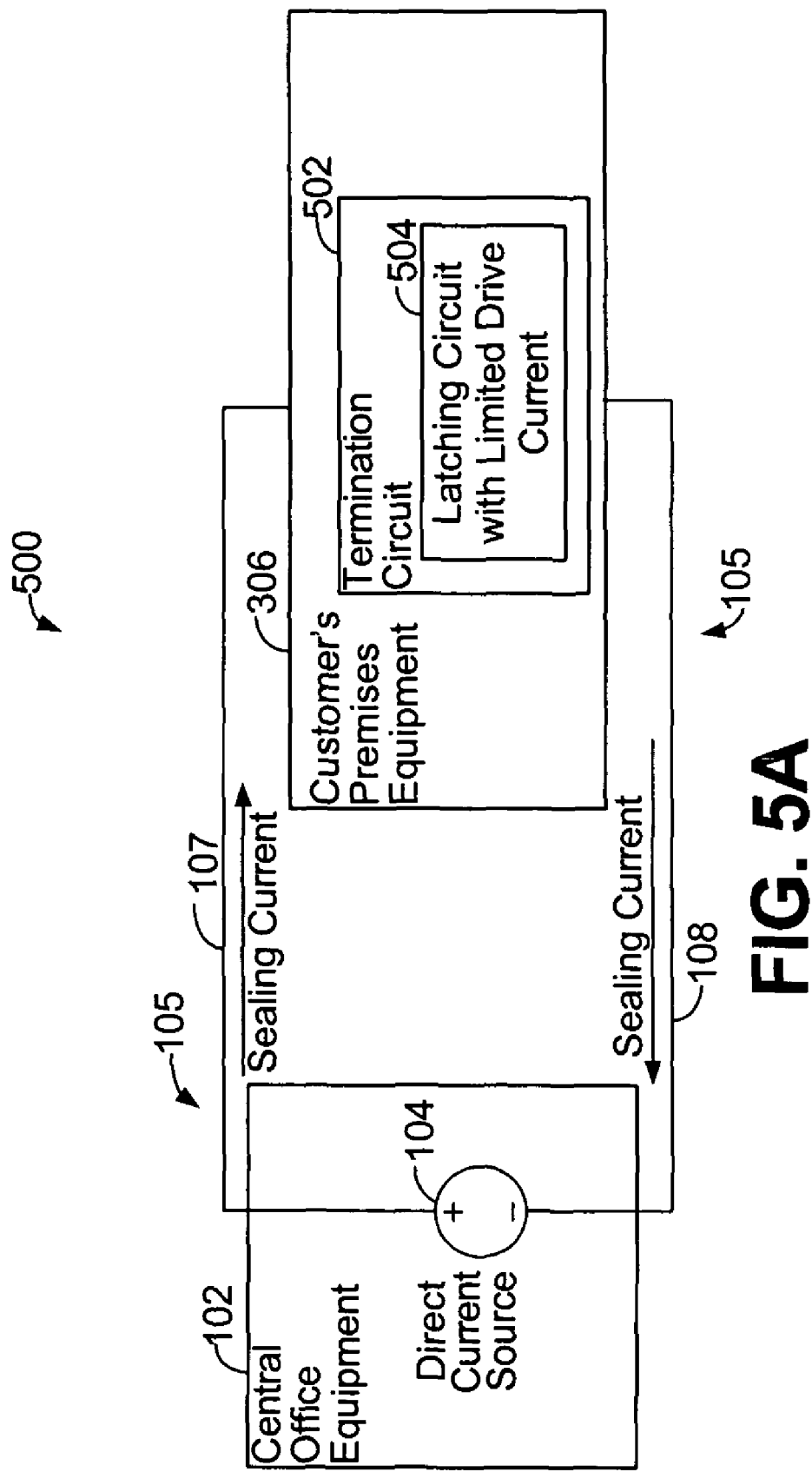
FIG. 5A is a block diagram illustrating a latching circuit of FIG. 3 with limited drive current.
Figure 5B:
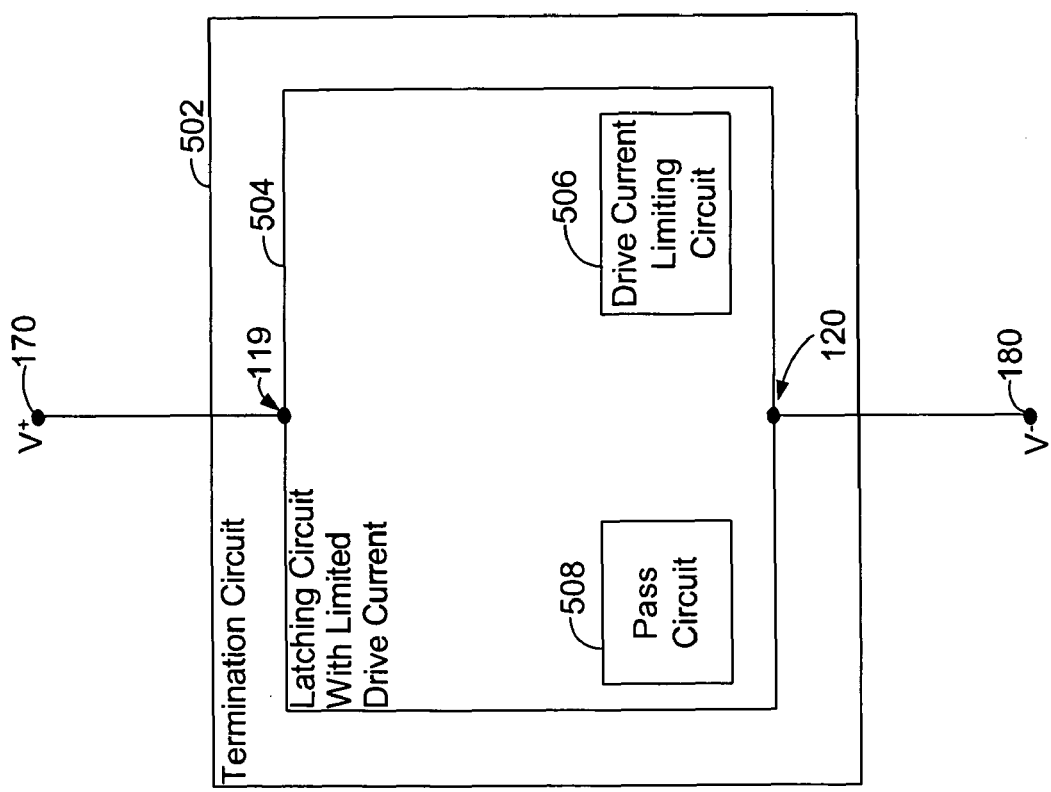
FIG. 5B is a detailed block diagram of the latching circuit of FIG. 5A.
Figure 5C:
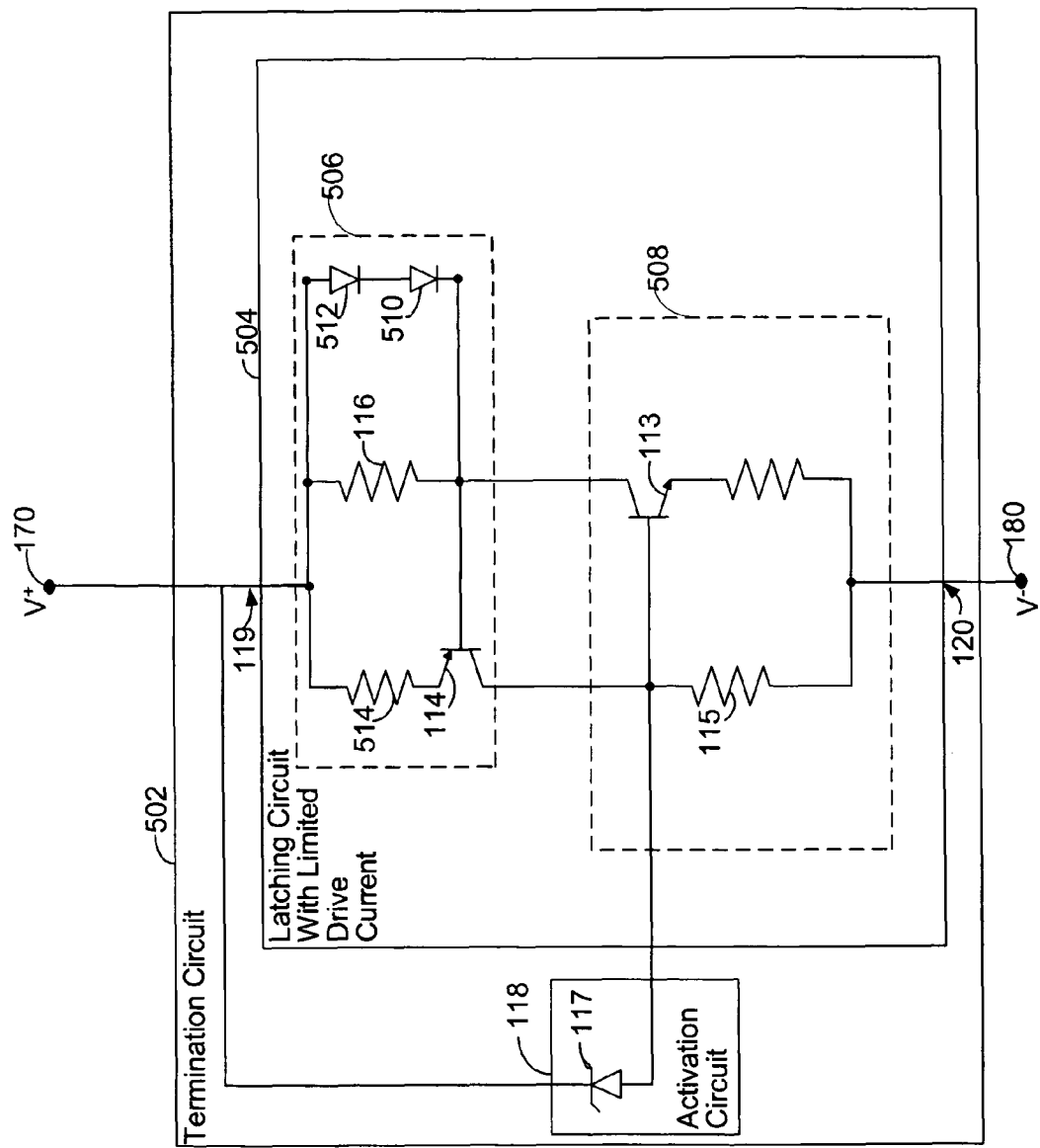
FIG. 5C is a detailed circuit diagram of the latching circuit of FIG. 5B.

FIGS. 5A-5C illustrate a sealing current circuit 500 in accordance with one embodiment of the circuit 300 illustrated in FIG. 3. In this regard, FIG. 5A illustrates a termination circuit 502 comprising a latching circuit 504 with limited drive current. As the voltage applied by the power source 104 increases, the latching circuit 504 with limited drive current limits the current through the subscriber line 105 to a substantially constant current value.

With reference to 5B, the latching circuit 504 with limited drive current comprises a pass circuit 508 and a drive current limiting circuit 506.

In operation, the latching circuit 504 with limited drive current begins conducting current when the voltage across nodes 170 and 180 reaches the activation voltage value. The drive current limiting circuit 506 begins conducting and drives the pass circuit 508. The pass circuit 508 "passes" the current from node 170 to node 180, thereby establishing a completed conducting path through which current travels from the anode 119 of the latching circuit 504 to the cathode 120 of the latching circuit 504 through the termination circuit 502.

The drive current limiting circuit 506 provides adequate current to turn on the pass circuit 508, but a limited current, so that some of that current may be diverted from the control input of the pass circuit 508 to establish a current in the pass circuit 508. By making the current of the drive current limiting circuit 506 small, the total current in the latching circuit 504 is dominated by the current flowing in the pass circuit 508. In addition, the drive current limiting circuit 506 ensures that the current through the pass circuit 508 and the drive current limiting circuit 506 does not exceed an amperage that, if exceeded, would damage the pass circuit 508 or the drive current limiting circuit 506.

Circuitry exemplifying the latching circuit 504 with limiting drive current, the pass circuit 508, and the drive current limiting circuit 506 is now described in more detail with reference to FIG. 5C.

As described hereinabove with reference to FIG. 1B, the SCR 126 (FIG. 1B) can be implemented using two transistors 113 (FIG. 1B) and 114 (FIG. 1B) and corresponding resistors 115 (FIG. 1B) and 116 (FIG. 1B). However, in high current scenarios, such an implementation may lead to component damage. In this regard, a majority of the current flowing through the SCR 126, when the termination circuit 110 is conducting, flows into the emitter of transistor 114, and only a portion of the current flows through the resistor 116. Note that the current portion ($I_{R116}$) flowing through resistor 116 can be calculated with the following formula:

$$I_{R116} = V_{be}/R_{116},$$

where $V_{be}$ represents the base-emitter voltage of the transistor 114 and $R_{116}$ represents the resistance in ohms of the resistor 116. The current into the emitter of the transistor 114 divides between its base and collector circuits. Thus, the base current of transistor 114 sees the base spreading resistance of transistor 114 in series with the turned on collector-emitter of transistor 113, and the collector of transistor 114 sees the base-emitter voltage of transistor 113 in parallel with resistor 115. In this regard, the current may divide almost evenly between the collector and base of the transistors 113 and 114 leading to damaging base currents for the transistors 113 and 114.

The modification of the SCR 126 to include the drive current limiting circuit 506 in FIG. 5C limits the current through the termination circuit and reduces the possibility of damaging base currents of the transistors 113 and 114. As illustrated in FIG. 5C, the termination circuit 502 comprises a latching circuit 504 with limited drive current having its anode 119 coupled to the connection 107 corresponding to the positive side of the DC voltage source 104 (FIG. 5A) and its cathode 120 coupled to the connection 108 corresponding to the negative side of the DC voltage source 104 (FIG. 5A).

With reference to FIG. 5C, the drive current limiting circuit 506 is implemented in the latching circuit 504 with the addition of resistor 514 and diodes 510 and 512. The pass circuit 508 (FIG. 5B) is implemented in the circuit 504 with transistor 113 and resistor 115.

The activation circuit 118 comprises a zener diode 117 and is connected to connection 107. Thus, when the voltage between connection 107 and connection 108 meets or exceeds a designated activation voltage, the zener diode 117 conducts current that appears at the base of transistor 113. The base current in transistor 113 induces a collector current in transistor 113, which turns on transistor 114 by a base current at the base of transistor 114.

Therefore, current flows from the anode 119 to the cathode 120 through the latching circuit 504 with limited drive current. However, current also flows through the serial diodes 510 and 512. The current diversion effectuated by diodes 510 and 512, in conjunction with the resistor 514, limits the emitter current ($I_{E114}$) of transistor 114, i.e., the current is approximately:

$$I_{E114} = (V_{D510} + V_{D512} V_{be})/R_{514}$$

where $V_{D510}$ represents the voltage across diode 510, $V_{D512}$ represents the voltage across diode 512, $V_{be}$ is the base emitter voltage of transistor 114, and $R_{514}$ is the resistance in ohms of resistor 514. Limiting the emitter current of transistor 114, which is approximately equal to its collector current, limits the base current of the transistor 113. Notably, the latching circuit 504 is born of the proper interconnection of the pass circuit 508 and the drive current limiting circuit 506.

Figure 6A:
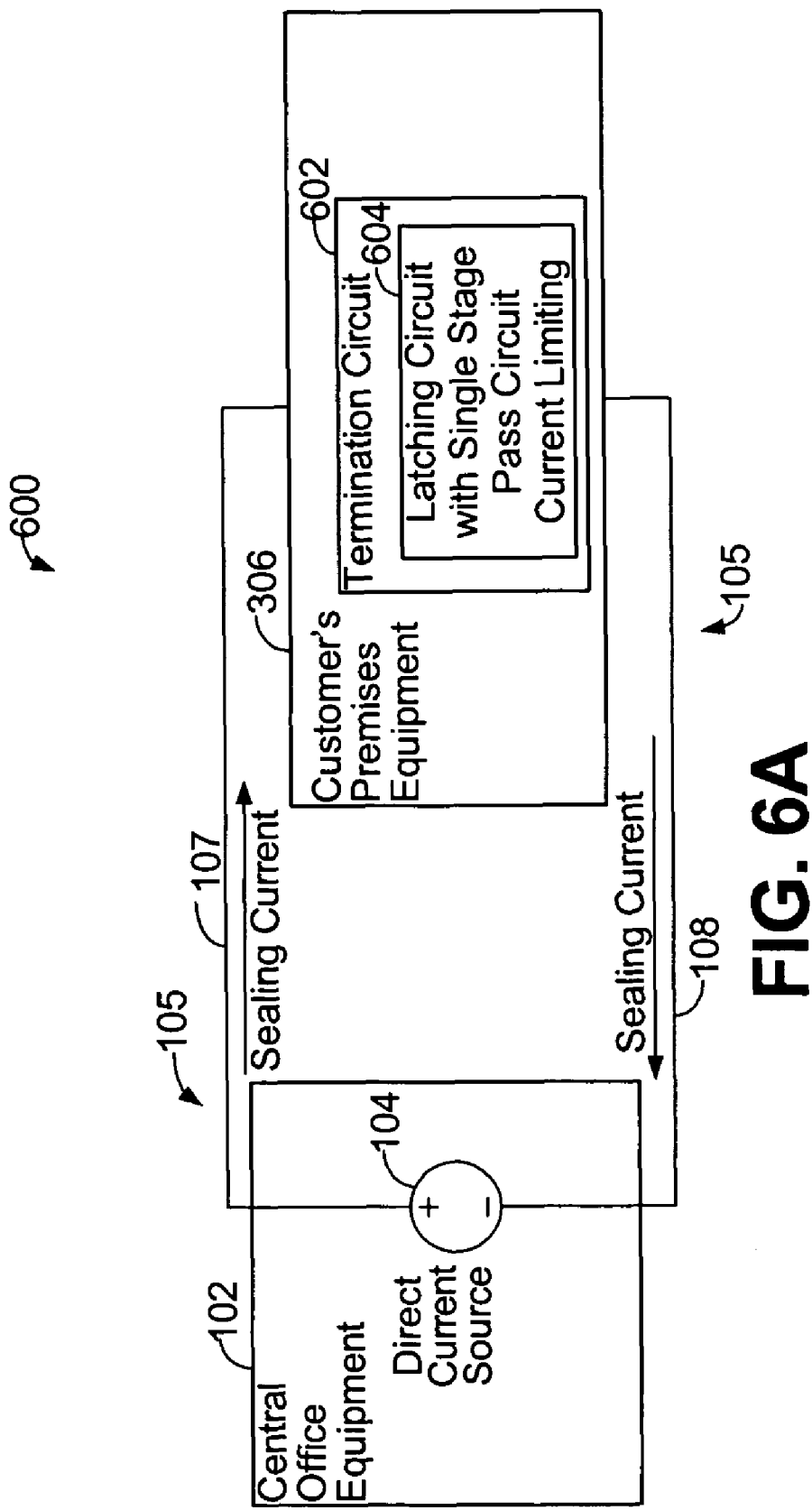
FIG. 6A is a block diagram illustrating a latching circuit of FIG. 3 having pass circuit single stage current limiting.
Figure 6B:
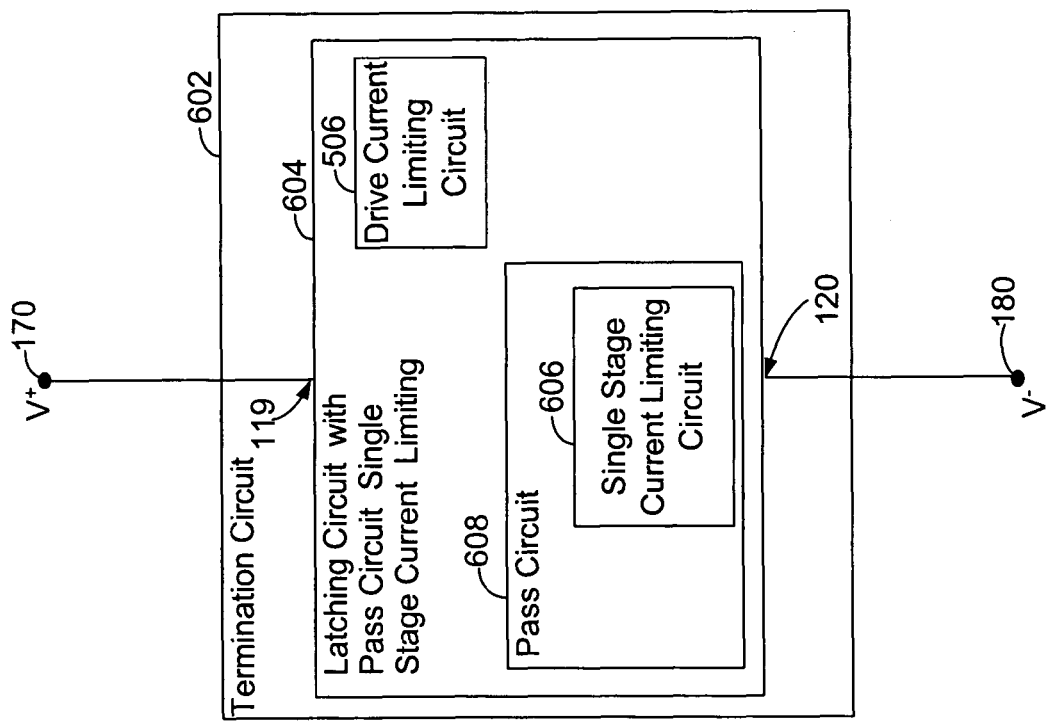
FIG. 6B is a block diagram of the latching circuit of FIG. 6A having a single stage current limiting circuit.
Figure 6C:
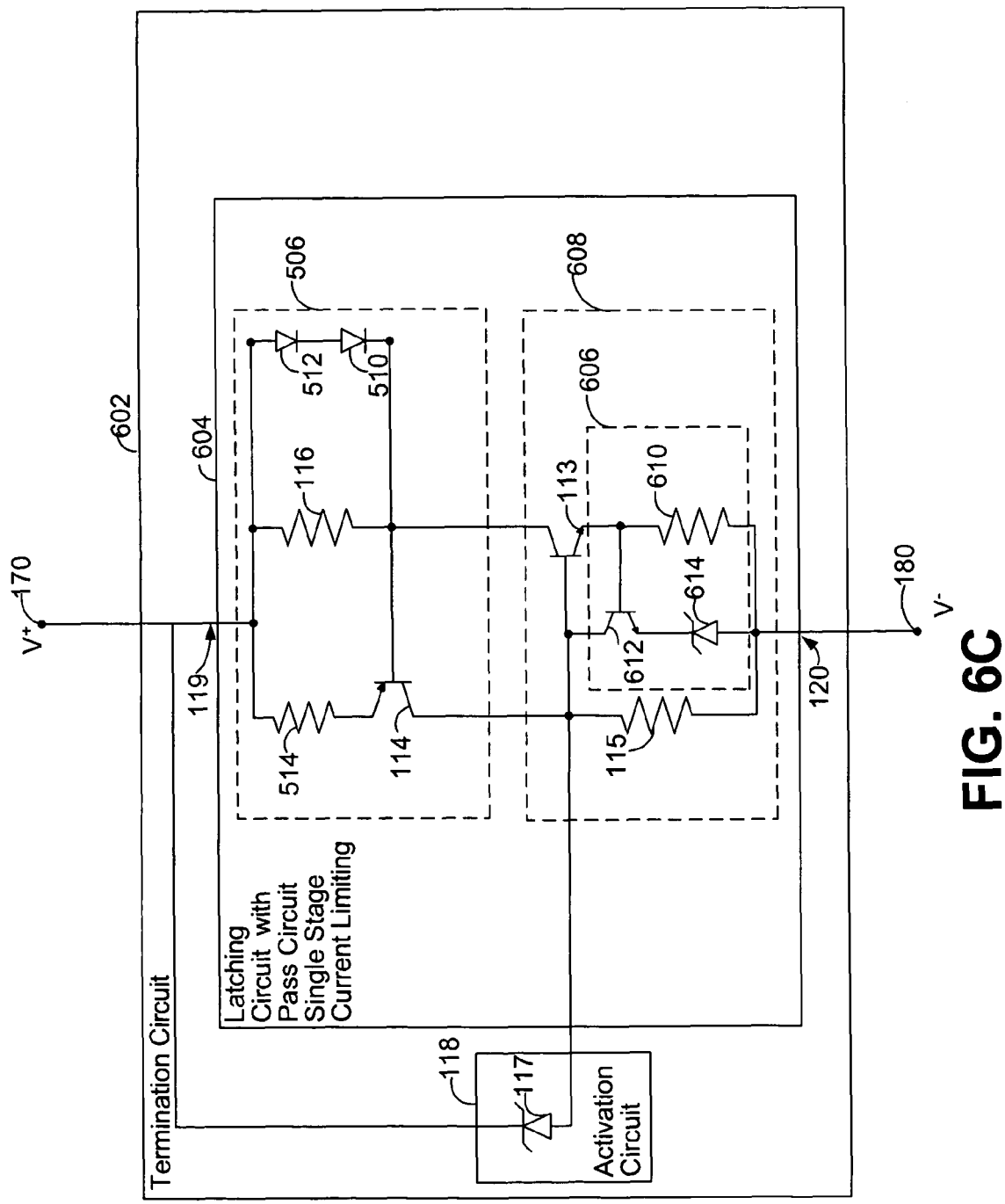
FIG. 6C is a detailed circuit diagram of the latching circuit of FIG. 6B having the single stage current limiting circuit.

FIGS. 6A-6C illustrate a sealing current circuit 600 in accordance with another embodiment of the circuit 300 illustrated in FIG. 3. The circuit 600 comprises a termination circuit 602 comprising a latching circuit 604 with pass circuit single stage current limiting. In such an embodiment, the latching circuit 604 limits the current through the termination circuit 602 to a substantially constant value upon activation regardless of an increase in voltage between connection 107 and connection 108. However, the current limiting is provided by the pass circuit 608 (FIG. 6B), described further herein with reference to FIG. 6B.

In this regard, FIG. 6B illustrates a latching circuit 604 with pass circuit single stage current limiting. The latching circuit 604 comprises a pass circuit 608, which comprises a single stage current limiting circuit 606. Thus, in addition to current limiting provided by the drive current limiting circuit 506, the pass circuit 608 also comprises current limiting provided for by the single stage current limiting circuit 606.

As an example, the Standards provide a 15 V/20 mA voltage-current rating for a sealing current termination circuit for use in ISDN applications and SHDSL applications. Therefore, the latching circuit 604 of termination circuit 602 that conforms to the Standards may maintain a constant current limit of approximately 20 mA while the termination circuit is activated as opposed to enabling a greater current to conduct as the voltage over the connections 107 and 108 increases. Thus, the termination circuit 602 limits the current increase to the minimum amount provided by the Standards, i.e., 20 mA, without allowing the current to increase further. Thus, the termination circuit 602 minimizes power dissipation.

Circuitry exemplifying the latching circuit 604 with pass circuit single stage current limiting and the pass circuit 608 is now described in more detail with reference to FIG. 6C.

With reference to FIG. 6C, the latch circuit 604 with pass circuit single stage current limiting comprises the drive current limiting circuit 506, described with reference to FIGS. 5A-5C, and the pass circuit 608. The pass circuit 608 comprises a single stage current limiting circuit 606 that is implemented via a transistor 612, a zener diode 614, and a resistor 610.

It is instructive to note that a zener diode has a specified value to which the voltage is clamped, and for simplified analysis of the single stage current limiting circuit 606, the zener diode 614 shall be described as having a 5-volt specified voltage. Additionally, the voltage between the base and emitter of most silicon transistors is approximately 0.6 volts if the transistor is "on," as described hereinabove. Note that other diode and transistor voltages are possible in other embodiments.

In operation, transistor 612 and zener diode 614 are inactive until the voltage drop across resistor 610 approaches a voltage equal to the sum of the zener diode voltage and the base emitter voltage of transistor 612. In the example provided, this voltage drop is the sum of the specified voltage of the zener diode 614, approximately 5 volts, and the base-emitter voltage of the transistor 612, approximately 0.6 volts, which is approximately 5.6 volts. Therefore, in order to limit the current through resistor 610 to a value of 22 mA, the minimum current specification provided in the Standards for a termination circuit, the rating on the resistor shall be 255 as shown by the following formula:

$$R_{608} = 5.6 \text{ volts}/22 \text{ mA} = 255 \text{ ohms}.$$

In addition to limiting the current to a single constant current value as described hereinabove with reference to FIGS. 6A-6C, another embodiment of the Present disclosure limits the current to dual constant current values based upon the voltage supplied by the power source 104 (FIG. 1).

Figure 7A:
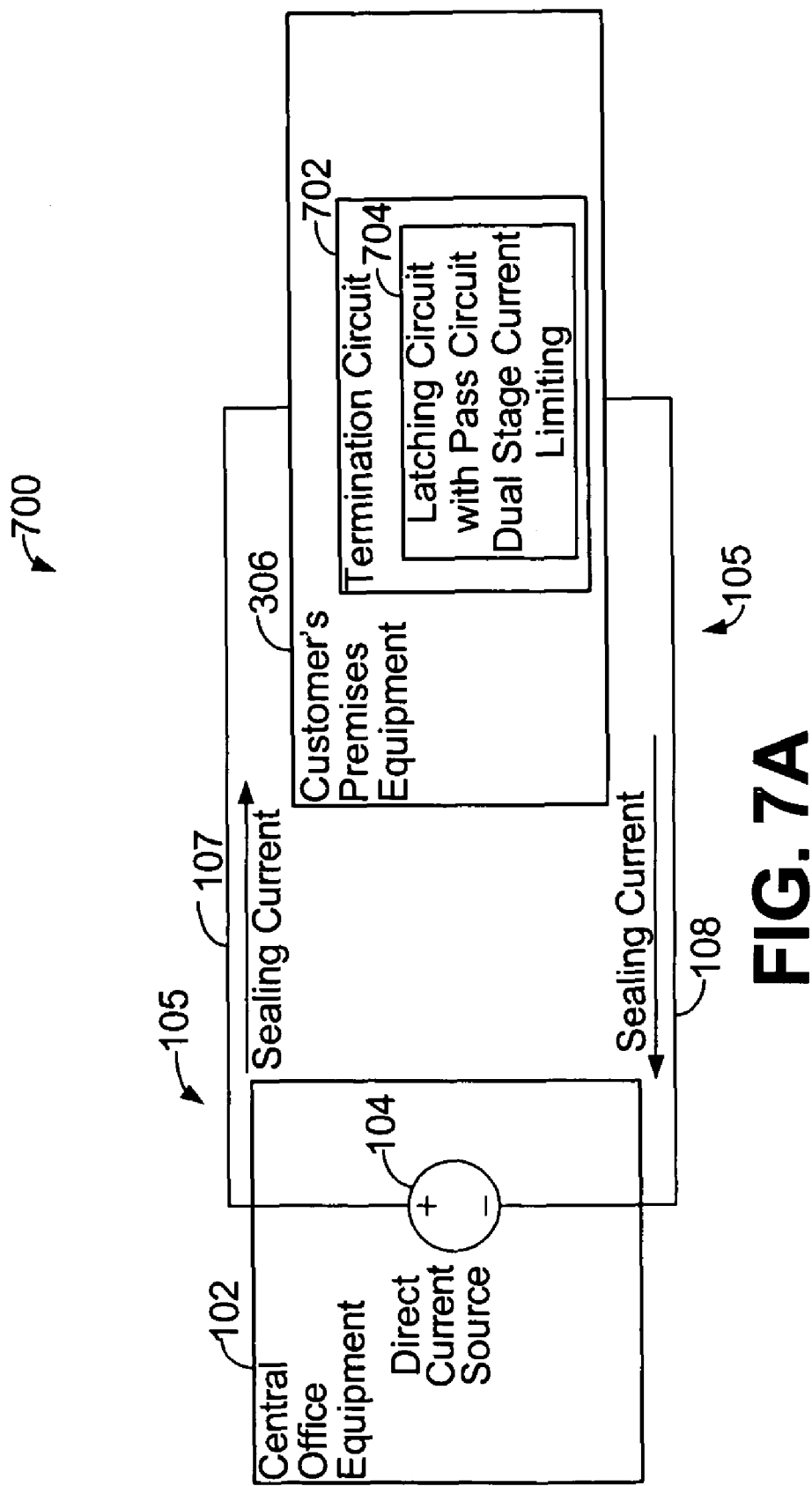
FIG. 7A is a block diagram illustrating a latching circuit of FIG. 3 with pass circuit dual stage current limiting.
Figure 7C:
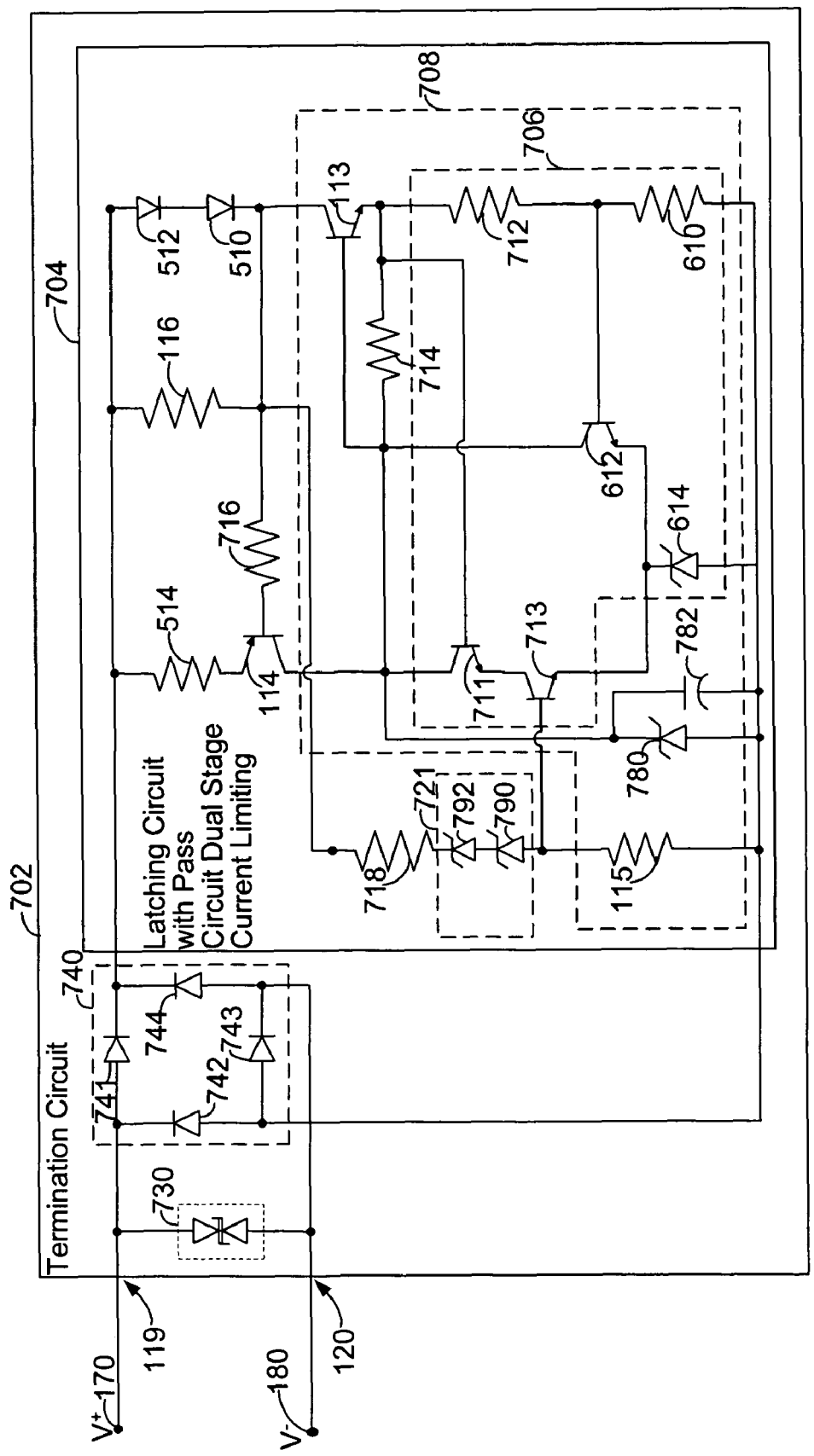
FIG. 7C is a detailed circuit diagram of the latching circuit of FIG. 7B with the dual stage current limiting circuit.

FIGS. 7A-7C illustrate a sealing current circuit 700 in accordance with yet another embodiment of the circuit 300 illustrated in FIG. 3 that limits the current to dual constant current values based upon the terminal voltage appearing from 107 to 108. The circuit 700 comprises a termination circuit 702. The termination circuit 702 comprises a latching circuit 704 with pass circuit dual stage current limiting. In such an embodiment, the latching circuit 704 limits the current to dual values depending upon the voltage applied by the power source 104.

In this regard, the latching circuit 704 controls the current levels depending upon the value of the voltage applied across connection 107 and 108, i.e., for low voltages, the circuit 704 limits the current to a first value and for high voltages, the circuit 704 limits the current to a different value.

For example, at 30 volts the latching circuit 704 is activated and may conduct a constant current of approximately 20 mA, as described with reference to FIGS. 6A-6C, but if the voltage applied voltage from 107 to 108 is in excess of fifty-four volts, as provided for in the Standards, the latching circuit 704 may conduct a constant current of approximately 9 mA regardless of an increase in voltage between connection 107 and connection 108. This behavior corresponds to the Standards as discussed herein.

An exemplary latching circuit 704 with pass circuit dual stage current limiting of FIG. 7A is illustrated in FIG. 7B. The latching circuit 704 comprises the drive current limiting circuit 506, described with reference to FIGS. 5A-5C, a pass circuit 708, and a voltage triggering circuit 710. Further, the pass circuit 708 comprises a dual stage current limiting circuit 706.

In such an embodiment, the dual stage current limiting circuit 706 of the pass circuit 708 limits the current through the latching circuit 704 to a first substantially constant current value until a the voltage between the connections 107 and 108 exceeds a threshold voltage. When the threshold voltage is exceeded, the voltage triggering circuit 710 triggers the dual stage current limiting circuit 706, and the circuit 706 then limits the current through the latching circuit 704 to a second substantially constant current value.

For example, if the power source 104 places 100 volts between the connections 107 and 108 of the termination circuit 702 illustrated in FIG. 6C, the power dissipation is as follows:

$$P = V*I = 100 \text{ Volts} * 22 \text{ mA} = 2.2 \text{ Watts}.$$

However, if the minimum constant current limit were reduced to, for example 9 mA as provided by the Standards, then the power dissipation could be reduced to 0.9 Watts. In this regard, the Standards prescribe that when the voltage across the connections 107 and 108 exceeds 54 volts, the current drawn by the circuit can be reduced to 9 mA. Thus, the latching circuit 704 limits the current to a first constant current value as described with reference to FIGS. 6A-6C and to a second constant current value for higher voltages.

FIG. 7B illustrates an exemplary latching circuit 704 with pass device dual stage current limiting. The latching circuit 704 with pass circuit dual stage current limiting is implemented via an exemplary circuit 706 and the voltage triggering circuit 710. Further illustrated in FIG. 7C, and integrated with the voltage triggering circuit 710, is an exemplary activation circuit 721 (FIG. 7C).

The voltage triggering circuit 710 enables dual stage current limiting when the voltage between the connections 107 and 108 reaches a voltage threshold. For example, when the voltage level reaches 54 volts, as provided for in the Standards. When the voltage at connection 107 reaches a voltage threshold, the dual stage current limiting circuit 706 limits current through the termination circuit 302 to a different constant current level.

Thus, the dual stage current limiting circuit 706 is limits the current to a constant current value regardless of an increase in voltage at the connection 107 while the voltage is above the threshold voltage. For example, as indicated hereinabove, the Standards for the sealing current termination circuit indicate a 54V/9 mA voltage-current rating for a termination circuit for use in ISDN applications and SHDSL applications. Therefore, the circuit's dual stage current limiting circuit 706 of a termination circuit 702 that conforms to the Standards may be configured to maintain a constant current limit of approximately 9 mA when the voltage exceeds the threshold voltage, i.e., 54 V, as opposed to enabling a greater current to conduct as the voltage over the connections 107 and 108 increases above 54 volts. In this regard, the conforming termination circuit 702 limits the current increase to the minimum amount provided by the specifications, and without allowing the current to increase further, the termination circuit 702 minimizes power dissipation.

FIG. 7C illustrates an exemplary circuit-level implementation for effectuating the voltage triggering circuit 710 and the dual stage current limiting circuit 706 for the pass circuit 708 of FIG. 7A. The dual stage current limiting circuit 706 limits the constant current through the termination circuit 702 when the voltage across the connections 107 and 108 exceeds a threshold above that for the single stage current limiting circuit 602 (FIGS. 6A-6C).

The functionality of the dual stage current limiting circuit 706 is achieved via two transistors 711 and 713 and resistor 712. At a predetermined input voltage, the voltage triggering circuit 710 provides a base-emitter voltage to transistor 713 that is sufficient to induce a collector current in transistor 713 that activates transistor 711. This is described in more detail in the discussion hereafter regarding the voltage triggering circuit 710. For purposes of dual stage current limiting, upon triggering, the current is limited by the resistors 610 and 712. Thus, in accordance with the Standards, at 54 volts between the connections 107 and 108, the termination circuit 302 limits the current to approximately 9 mA. Therefore, if $R_{610}$ is 255 ohms, and $R_{712}$ is 255 ohms then the constant current limit can be maintained as shown by the following formula:

$$I = 5.6 \text{ Volts}/(R_{610}+R_{712}) = 5.6/255 = 255 = 11 \text{ mA}$$

Note that although the Standards allow for a 9 mA minimum current limit, the circuit 706 is configured to limit the current to 11 mA to allow for circuit tolerances while still meeting the Standards. Moreover, power dissipation linearly increases as the voltage between the connections increases.

The functionality of the voltage triggering circuit 710 (FIG. 7B) is achieved via a voltage divider comprising resistors 718 and 115 separated by the activation circuit 721 comprising zener diodes 790 and 792. Notably, a voltage divider is a circuit that provides a different output voltage than supplied to it depending upon the values of the resistors. Thus, the voltage at the base of transistor 713 when diodes 512 and 514 are conducting can be calculated by the following formula:

$$V_{713base} = \frac{V_{in} - 4V_d - V_{790} - V_{792}}{R_{718} + R_{115}} \cdot R_{115} \quad \text{Equation 1}$$

where $V_{in}$ is the voltage across connections 107 and 108, $R_{718}$ is the resistance of resistor 718 and $R_{115}$ is the resistance of resistor 115.

Therefore, Equation 1 can be used in order to verify that $V_{in}$ is safely within the 56-volt threshold, $V_{in}$ can be solved for using Equation 1 as follows:

$$V_{in} = \left[\frac{V_{706base}}{R_{115}} * (R_{718} + R_{115})\right] + 4V_d + V_{790} + V_{792},$$

where the component values are as follows:
$R_{115} = 8870\Omega$
$R_{718} = 45300\Omega$
$V_{790} = 11.5$ V
$V_{792} = 11.5$ V
$V_{713\ base} = 5.6$ V Thus, $$V_{in} = \left[\frac{5.6}{8870} * (8870+45300)\right] + 4*6 + 11.5 + 11.5, V_{in} = 59.6,$$

which is safely above the threshold called for in the Standards.

In order to describe in more detail the voltage triggering circuit 710 and the activation circuit 721 of the termination circuit 702, FIG. 7C further illustrates a sidactor 730 and a diode bridge 740. Note that the sidactor 730 ensures that if the voltage between the connections 107 and 108 reach 130 volts, the voltage across the circuit 702 is clamped to a low voltage, protecting the circuit from damage by lightning and power cross events, and the bridge 740 ensures that the correct polarity is applied to the termination circuit 702.

Activation of the termination circuit 702 occurs when the voltage across resistor 714 is equal to the base-emitter voltage of a transistor, which is approximately 0.6 volts. This occurs when approximately 0.6 volts appears across resistor 116, which turns on transistor 114.

The following example provides component values in order to illustrate the activation and triggering mechanisms of the activation circuit 721 and the voltage triggering circuit 710 (FIG. 7B) of the termination circuit 702.

In this regard, a zener diode specification voltage is approximately 12 volts. However, in the turn on regime illustrated in FIG. 7C, the actual voltage across the zener diodes is 11.5 V. Thus, the voltage drop over diode 512 and 514 is equal to about 11.5 volts. In addition, since a standard diode specification voltage is approximately 0.5 volts, then the drop over diodes 741-744 is equal to about 0.5 volts. Thus, in determining the voltage at the connectors that activates termination circuit 702 the following formula may be employed:

$$\frac{(V_{line} - V_d - V_d - V_{zd} - V_{zd}) * R_{116}}{R_{718} + R_{115}} = V_{be}$$

where $V_{line}$ represents the voltage between lines 107 and 108, the first $V_d$ represents the voltage drop across diode 741, the second $V_d$ represents the voltage drop across diode 743, the first $V_{zd}$ represents the voltage drop across zener diode 512, the second $V_{zd}$ represents the voltage drop across zener diode 510, and Vbe is the base-emitter voltage of transistor 114. Further, $R_{116}$, $R_{718}$, and $R_{115}$ represent the resistance values of resistors 116, 718, and 115, respectively.

Thus, $V_{line}$ can be solved for using the following equation:

$$V_{line} = 2*V_d + \frac{V_{be}*R_{115} + V_{be}*R_{116} + 2*R_{116}*V_{dz} + V_{be}*R_{718}}{R_{116}}.$$

And the following resistor values are used:
$R_{710} = 8870$ ohms;
$R_{116} = 3480$ ohms;
$R_{712} = 45300$ ohms; and
$R_{115} = 10000$ ohms.

Therefore, the activation voltage may be calculated as follows:

$$V_{line} = 2*.5 + \frac{.6*8870 + .6*3480 + 2*3480*11.5 + .6*45300}{3480} = 33.94 \text{ Volts},$$

which is within the Standards' activation voltage specifications of 30 to 39 volts.

The latching circuit 704 with pass circuit dual stage current limiting of FIG. 7C further comprises a zener diode 780 and a capacitor 782. The diode 780 and the capacitor 782 work in conjunction to control the turn-on timing of the dual stage current limiting circuit 706. In addition, the zener diode 780 and the capacitor 782 provide protection and stability for the current limiting circuits 506, 606, and 706.

Figure 8:
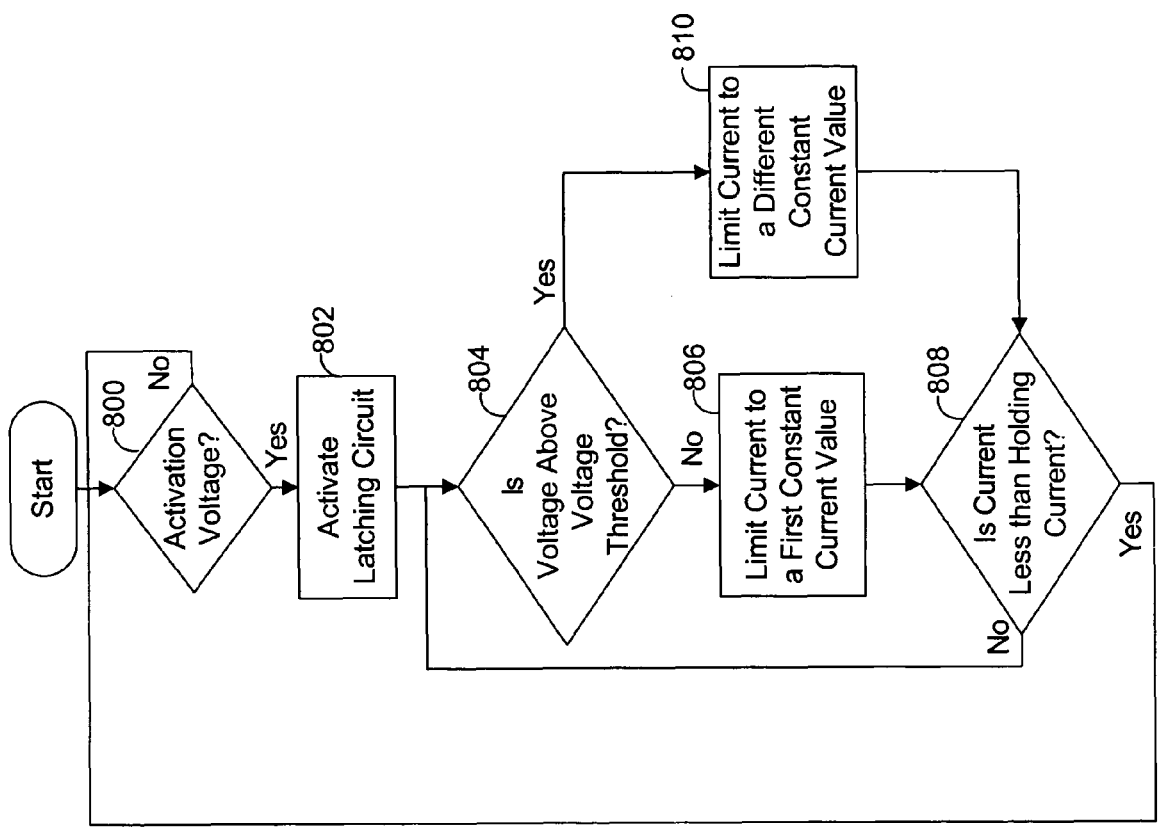
FIG. 8 is a flowchart illustrating exemplary architecture and functionality of the present disclosure.

An exemplary architecture and functionality of a latching circuit 704 with pass circuit dual stage current limiting is now described with reference to FIG. 8.

The activation circuit 721 (FIG. 7C) activates the latching circuit 704 (FIG. 7C) when the activation voltage appears across lines 107 and 108, as indicated in steps 800 and 802. If the Standards described herein are implemented, then the latching circuit 704 is preferably configured to activate at an activation voltage of between 30 volts and 39 volts.

If the voltage between the lines 107 and 108 is less than a particular voltage threshold, as determined in step 804, then the latching circuit 704 limits the current through the connections 107 and 108 (FIG. 3) to a relatively constant current value, as indicated in 806. Such constant current value is a relatively low value that aids in minimizing power dissipation of the current limiting latching circuit 704.

If the voltage between the lines 107 and 108 is greater than the voltage threshold, then the latching circuit 704 limits the current to a different constant current value, as indicated in step 810.

If the current through the lines 107 and 108 drops below the holding current of transistor 114 (FIG. 7B), then current flow through the circuit 704 terminates and the circuit 704 remains inactive until the activation voltage appears across the line 107 and 108, as indicated in step 808 and step 800.

Now, therefore, the following is claimed:

1. A sealing current system for a subscriber line, comprising:
   a power source coupled to a first end of the subscriber line and configured to apply a voltage to the subscriber line thereby generating a sealing current in the subscriber line; and
   a sealing current termination circuit configured to receive and terminate the sealing current, the sealing current termination circuit coupled to a second end of the subscriber line that is remote from the first end, the sealing current termination circuit further configured to limit the sealing current in the subscriber line,
   wherein an activation circuit activates a first transistor when a voltage on the subscriber line exceeds a threshold voltage, wherein a second transistor is activated by a current from the first transistor, and wherein a portion of the current from a wire of the subscriber line is diverted through a series of diodes thereby limiting the sealing current.

2. The system of claim 1, wherein the termination circuit comprises an activation circuit configured to activate a current limited circuit.

3. The system of claim 2, wherein the termination circuit is configured to limit a drive current of the termination circuit.

4. The system of claim 2, wherein the termination circuit is configured to limit a pass current of the termination circuit to a first substantially constant current value.

5. The system of claim 4, where the termination circuit is configured to limit the pass current of the termination circuit to a second substantially constant current value based upon the voltage between the connections.

6. The system of claim 1, wherein the sealing current termination circuit is further configured to divert a first portion of the sealing current received from the subscriber line through at least one diode and a second portion of the sealing current received from the subscriber line through a transistor, thereby limiting the sealing current passing through the transistor.

7. The system of claim 1, wherein the sealing current termination circuit comprises a pass circuit comprising a first transistor coupled at its base to an activation circuit and coupled at its emitter to a first wire of a subscriber line, the activation circuit further coupled to a second wire of the subscriber line.

8. The system of claim 7, wherein the sealing current termination circuit further comprises a drive limiting circuit comprising a second transistor coupled at its base to a collector of the first transistor, coupled at its collector to the base of the first transistor, and coupled at its collector to a second wire of the subscriber line, the drive limiting circuit further comprising a series of diodes coupled at a first end of the series to the second wire of the subscriber line and coupled at a second end of the series to the base of the second transistor and the collector of the first transistor.

9. The system of claim 8, wherein the activation circuit activates the first transistor when a threshold voltage on the subscriber line is exceeded, wherein the second transistor is activated by a current from the first transistor, and wherein a portion of the current from the first wire is diverted through the series of diodes, thereby limiting the current through the termination circuit.

10. A termination circuit, comprising:
    a voltage triggering circuit configured to enable conduction of a sealing current received from a power supply when a threshold voltage value is reached, the power supply connected to a first end of a subscriber line;
    a first current limiting circuit remote from the first end and connected to a second end of the subscriber line, the first current limiting circuit configured to limit the sealing current through the termination circuit to a first substantially constant value based upon a first voltage at a connection of the termination circuit; and
    a second current limiting circuit connected to the second end of the subscriber line and configured to limit the sealing current through the termination circuit to a second substantially constant value based upon the first voltage at the connection of the termination circuit,
    wherein an activation circuit activates a first transistor of the first current limiting circuit when a voltage on the subscriber line exceeds a threshold voltage, wherein a second transistor of the second current limiting circuit is activated by a current from the first transistor, and wherein a portion of the sealing current from a wire of the subscriber line is diverted through a series of diodes thereby limiting the sealing current through the termination circuit.

11. The termination circuit of claim 10, wherein the first current limiting circuit comprises a drive current limiting circuit coupled to the connection and a pass circuit coupled to the drive current limiting circuit.

12. The termination circuit of claim 11, wherein the pass circuit turns on the drive current limiting circuit thereby allowing a current to flow from the connection, the drive current limiting circuit limiting the current to the pass circuit.

13. The termination circuit of claim 12, wherein the first current limiting circuit comprises a single stage current limiting circuit coupled to the pass circuit, the single stage current limiting circuit configured to limit the current through the pass circuit to the first substantially constant current value based upon the voltage.

14. The termination circuit of claim 12, wherein the second current limiting circuit comprises a dual stage current limiting circuit coupled to the pass circuit, the dual stage current limiting circuit configured to limit the current through the pass circuit to the first substantially constant current value based upon the voltage and the second substantially constant current value based upon the second voltage.

15. The termination circuit of claim 10, further comprising an activation circuit.

16. The termination circuit of claim 15, wherein the activation circuit comprises a voltage divider.

17. The termination circuit of claim 10, wherein the first current limiting circuit is further configured to divert a first portion of the sealing current received from the subscriber line through at least one diode and a second portion of the sealing current received from the subscriber line through a transistor, thereby limiting the current passing through the termination circuit to the first substantially constant value.

18. A method for controlling current flow in a subscriber line, comprising the steps of:
　applying a voltage to a first end of the subscriber line thereby generating a sealing current in the subscriber line; and
　limiting, via circuitry at a second end of the subscriber line, the sealing current resulting from the applied voltage through a circuit at the second end of the subscriber line to a substantially constant current value, the circuit remote from the first end of the subscriber line,
　wherein the limiting step further comprises the steps of activating, via an activation circuit, a first transistor when a voltage on the subscriber line exceeds a threshold voltage, activating a second transistor by a current from the first transistor, and diverting a portion of the current from a wire of the subscriber line through a series of diodes thereby limiting the current through the termination circuit.

19. The method of claim 18, further comprising the step of limiting the current through the circuit to a second substantially constant current value when the voltage is above a threshold value.

20. The method of claim 19, further comprising the step of automatically changing the constant current value if the applied voltage changes to the threshold voltage.

21. The method of claim 20, further comprising the step of deactivating when the current through the subscriber line falls below a holding current value.

22. The method of claim 18, wherein the limiting step comprises the steps of diverting a first portion of the sealing current received from the subscriber line through at least one diode and diverting a second portion of the sealing current received from the subscriber line through a transistor.

23. A termination circuit, comprising: an activation circuit configured to enable flow of a sealing current if a voltage difference between two nodes of the circuit reaches a threshold value, the sealing current produced by a power supply at a first end of a subscriber line and the activation circuit connected to a remote second end of the subscriber line;
　a pass circuit at the remote second end of the subscriber line configured to pass the sealing current through the termination circuit; and
　a drive current limiting circuit at the remote second end of the subscriber line configured to limit current flowing between the nodes through the pass circuit,
　wherein an activation circuit activates a first transistor of the drive current limiting circuit when a voltage on the subscriber line exceeds a threshold voltage, wherein a second transistor of the drive current limiting circuit is activated by a current from the first transistor, and wherein a portion of the current from a wire of the subscriber line is diverted through a series of diodes thereby limiting the sealing current through the termination circuit.

24. The circuit of claim 23, wherein the pass circuit comprises a single stage current limiting circuit configured to limit the current through the pass circuit to a first relatively constant current value.

25. The circuit of claim 23, wherein the pass circuit comprises a dual stage current limiting circuit configured to limit the current through the pass circuit to a first relatively constant current value if the voltage difference is below a predetermined threshold value.

26. The circuit of claim 25, wherein the dual stage current limiting circuit is further configured to limit the current through the pass circuit to a second relatively constant current value if the voltage difference exceeds the predetermined threshold value.

27. The termination circuit of claim 23, wherein the drive current limiting circuit is configured to limit current flowing between the nodes through the pass circuit by diverting a first portion of the sealing current received from the subscriber line through at least one diode and a second portion of the sealing current received from the subscriber line through a transistor.

28. A sealing current system for a subscriber line, comprising:
　a power source coupled to a first end of the subscriber line configured to apply a voltage to the subscriber line thereby generating a sealing current in the subscriber line; and
　a sealing current termination circuit configured to receive and terminate the sealing current, the sealing current termination circuit having a pass circuit comprising a first transistor coupled at its base to an activation circuit and coupled at its emitter to a first wire of a subscriber line, the activation circuit further coupled to a second wire of the subscriber line and a drive limiting circuit comprising a second transistor coupled at its base to the collector of the first transistor, coupled at its collector to the base of the first transistor, and coupled at its collector to a second wire of the subscriber line, the drive limiting circuit further comprising a series of diodes coupled at a first end of the series to the second wire of the subscriber line and coupled at a second end of the series to the base of the second transistor and the collector of the first transistor, wherein the activation circuit activates the first transistor when a voltage on the subscriber line exceeds a threshold voltage, wherein the second transistor is activated by a current from the first transistor, and wherein a portion of the current from the first wire is diverted through the series of diodes thereby limiting the sealing current through the termination circuit.

* * * * *